US007111126B2

(12) United States Patent
Biles et al.

(10) Patent No.: US 7,111,126 B2
(45) Date of Patent: Sep. 19, 2006

(54) APPARATUS AND METHOD FOR LOADING DATA VALUES

(75) Inventors: Stuart D Biles, Cambridge (GB); Christopher B Dornan, Cambridge (GB); Vladimir Vasekin, Cambridge (GB); Andrew C Rose, Cambridge (GB)

(73) Assignee: ARM Limited, Cambridge (GB)

( * ) Notice: Subject to any disclaimer, the term of this patent is extended or adjusted under 35 U.S.C. 154(b) by 495 days.

(21) Appl. No.: 10/668,373

(22) Filed: Sep. 24, 2003

(65) Prior Publication Data

US 2005/0066131 A1    Mar. 24, 2005

(51) Int. Cl.
    G06F 12/00 (2006.01)
(52) U.S. Cl. ..................................... 711/137
(58) Field of Classification Search ................. 711/137
     See application file for complete search history.

(56) References Cited

U.S. PATENT DOCUMENTS

| 5,721,865 | A  | * | 2/1998  | Shintani et al. | 711/137 |
| 6,782,454 | B1 | * | 8/2004  | Damron          | 711/137 |
| 2002/0144062 | A1 | * | 10/2002 | Nakamura     | 711/137 |
| 2003/0018857 | A1 | * | 1/2003  | Anderson et al. | 711/137 |
| 2003/0196046 | A1 | * | 10/2003 | Abdallah et al. | 711/137 |
| 2004/0117557 | A1 | * | 6/2004  | Paulraj et al.  | 711/137 |
| 2004/0123044 | A1 | * | 6/2004  | Franaszek       | 711/137 |

* cited by examiner

Primary Examiner—Woo H. Choi
(74) Attorney, Agent, or Firm—Nixon & Vanderhye P.C.

(57) ABSTRACT

An apparatus and method for loading data values from a memory system are provided. The data processing apparatus comprises a data processing unit operable to execute instructions, and a register file having a plurality of registers operable to store data values accessible by the data processing unit when executing the instructions. Further, a holding register is provided which does not form one of a working set of registers of the register file, and is operable to temporarily store a data value, the holding register having a data portion for storing the data value, and an identifier portion operable to store identifier data associated with the data value. The data processing unit is then responsive to a preload instruction to issue a preload memory access request to a memory system to cause a data value identified by the preload instruction to be located in the memory system, and dependent on predetermined criteria to cause a copy of that data value along with associated identifier data to be loaded from the memory system into the holding register. Furthermore, the data processing unit is responsive to a load instruction to cause a comparison operation to be performed to determine whether identifier data derived from the load instruction matches the identifier data in the identifier portion of the holding register. If it does, the data value stored in the holding register is made available to the data processing unit without requiring a memory access request to be issued to the memory system. Only in the event of there being no match does the memory access request get issued to the memory system to cause a data value identified by the load instruction to be made available to the data processing unit from the memory system.

44 Claims, 8 Drawing Sheets

APPARATUS AND METHOD FOR LOADING DATA VALUES

BACKGROUND OF THE INVENTION

1. Field of the Invention

The present invention relates to an apparatus and method for loading data values, and in particular to a technique for loading data values from a memory system so that they are subsequently available for use by a data processing unit.

2. Description of the Prior Art

A known data processing apparatus, for example a processor core, may comprise a data processing unit operable to execute instructions, and a register file having a plurality of registers for storing data values accessible by the data processing unit when executing those instructions. It will be appreciated that the data values may take a variety of forms, and by way of example may take the form of 32-bit data words, with each register of the register file being able to hold one such data word.

A memory system accessible by the data processing apparatus will typically be provided for storing data values, with data values required by the data processing unit being loaded from the memory system into the register file from where they can be accessed by the data processing unit. Subsequent to manipulation by the data processing unit, data values are typically stored from the register file back to the memory system, thereby freeing up space within the register file for subsequent data values to be loaded.

It will be appreciated that when executing a typical program on the data processing unit, a significant number of such load and store operations will need to be performed. The time taken to load data values from the memory system into the register file can have a very significant impact on the performance of the data processing apparatus. In an attempt to seek to reduce the time taken to load data from the memory system, also referred to herein as the load latency, it is known to arrange the memory system in a hierarchical manner, such that the memory system consists of a number of layers of memory. In such an arrangement, there will typically be at least one layer which can hold only a relatively few number of data values, but which can be accessed relatively quickly by the data processing apparatus, with the memory system also including at least one layer which is significantly larger, also referred to herein as bulk memory, and hence can store more data values, but which can only be accessed relatively slowly.

In a typical arrangement, when the data processing unit of the data processing apparatus issues a memory access request to the memory system, that request will first be received by a layer of the memory system which is relatively small but can be accessed quickly. For the purposes of the following description, that layer will be referred to as the layer one level of the memory system, and typically is implemented by a cache. If the requested data value is present in that layer one cache, then it can be returned to the data processing apparatus relatively quickly. However, in the event that the data value is not present in the layer one cache, then the access request will need to be propagated to one or more lower levels of the memory system in order to identify and retrieve the required data value, with the resultant increase in time taken to return that data value to the data processing apparatus. Typically as the data value is returned to the data processing apparatus, it will also be stored within the layer one cache, such a process being referred to as a linefill process.

Whilst such a hierarchical memory system can hide somewhat the latency of bulk memory, it is clear that the cache is only effective in reducing the load latency if the data value required is present in the cache. In an attempt to seek to increase the likelihood that the data value will be present in the cache, it is known to employ preload instructions which are typically placed at an earlier location within the program code than the real load instruction, and which can be used as a hint to the memory system that a real load is likely to take place in the near future. Whilst the preload instruction typically has no effect within the data processing apparatus, in that it is treated as a NOP ("no operation") instruction and hence does not cause any update of the data processing apparatus architectural state, the memory system itself can make use of this preload instruction by causing a linefill process to take place if required to ensure that the data value is then present in the layer one cache prior to the real load being issued. Hence, when the subsequent load instruction issues for real, the data value will be located within the layer one cache, and can be loaded into the register file relatively quickly.

Hence, the use of such preload, or hint, instructions can further help hide the latency of bulk memory. However, there are other performance limiting features that are becoming more significant as processors become more advanced, and in particular operate more quickly. Most modern processors are arranged in a pipelined manner, which allows multiple instructions to be in the process of execution at any point in time, and there is a desire to increase processor performance through higher operating frequencies. As clock frequencies increase, and pipeline depths tend to farther increase, it has been found that even the layer one cache of the memory system has difficulty keeping up with the requirements of the processor, and accordingly can negate the performance improvement obtained by operating the processor at a higher frequency. This performance impact can be expressed in terms of a "load-use penalty", the term load-use penalty referring to the time it takes between issuing a load instruction and the point being reached where the data loaded by that instruction is available for a subsequent instruction. The load-use penalty is becoming particularly important in modern day processors, for example (but not limited to) processor cores using commodity compiled RAM Random Access Memory).

As an example of load-use penalty, consider the following code sequence:

LDR r0, [$r_1$, $r_2$]
ADD r3, r4, r0

As can be seen, the add instruction has a dependency on the result of the load instruction, since one of its operands is r0. In a 5-stage pipeline (consisting of fetch, decode, execute, memory and write-back stages), the flow of execution might be

|     | 1 | 2 | 3 | 4 | 5 | 6 | 7 |
|-----|---|---|---|---|---|---|---|
| LDR | F | D | E | M | W |   |   |
| ADD |   | F | D | — | E | M | W |

For the LDR instruction, the effective address (ea) is calculated in the 'E' stage, and is the sum of $r_1$ and $r_2$. This ea is issued to the L1 memory system in the 'E' stage (cycle 3) and the memory system must respond (L1 cache hit case) with the data by the end of the 'M' stage (cycle 4).

As can be seen, the ADD instruction ideally needs the value of r0 at the start of cycle 4 but it is not available then. Hence a single cycle stall occurs which pushes the ADD 'E' stage to the right by a cycle.

Therefore this example has a load-use penalty of 1.

The load-use penalty is therefore an effect of pipelining of the memory access. The latency of the memory system has an impact on how deep this pipelining must be.

In a higher frequency system, more time may be need to access L1. As an example, consider the following 8-stage pipeline:

|     | 1 | 2 | 3 | 4 | 5 | 6 | 7 | 8 | 9 | 10 | 11 |
|-----|---|---|---|---|---|---|---|---|---|----|----|
| LDR | $F_1$ | $F_2$ | D | I | $E_1$ | $E_2$ | $E_3$ | W | | | |
| ADD |   | $F_1$ | $F_2$ | D | I | — | — | $E_1$ | $E_2$ | $E_3$ | W |

In this example, the LDR calculates the ea in cycle 5, issues it to the memory system in cycle 6, receives the data at the end of cycle 7 and writes it to the register file/forwards to other instructions at the end of cycle 8.

The ADD instruction needs the data at the start of its $E_2$ stage. This example illustrates a load-use penalty of 2.

As frequencies increase there is the possibility of further pipelining being needed.

Common techniques to reduce the impact of load-use penalty are at the software compilation stage. If the compiler can separate the LDR from the dependent instruction with other (useful) instructions then the load-use penalty can be hidden.

There are limitations to this approach—for example, sometimes there might not be enough instructions available (in terms of what the program needs) to be able to separate the load and using instruction.

As the load-use penalty increases, the number of suitable "separating" instructions that must be identified increases and the problem rapidly becomes intractable.

Accordingly, it will be desirable to provide a technique which further improves the speed of a load operation within the data processing apparatus.

SUMMARY OF THE INVENTION

Viewed from a first aspect, the present invention provides a data processing apparatus comprising: a data processing unit operable to execute instructions; a register file having a plurality of registers operable to store data values accessible by the data processing unit when executing said instructions; a holding register not forming one of a working set of registers of the register file and operable to temporarily store a data value, the holding register having a data portion for storing the data value, and an identifier portion operable to store identifier data associated with the data value; the data processing unit being responsive to a preload instruction to issue a preload memory access request to a memory system to cause a data value identified by the preload instruction to be located in the memory system, and dependent on predetermined criteria to cause a copy of that data value along with associated identifier data to be loaded from the memory system into the holding register; and the data processing unit being responsive to a load instruction to cause a comparison operation to be performed to determine whether identifier data derived from the load instruction matches the identifier data in the identifier portion of the holding register, and in the event of a match to cause the data value stored in the holding register to be made available to the data processing unit without requiring a memory access request to be issued to the memory system, and in the event of no match to issue the memory access request to the memory system to cause a data value identified by the load instruction to be made available to the data processing unit from the memory system.

In accordance with the present invention, the data processing apparatus includes a holding register which does not form one of a working set of registers of the register file. At any point in time, the working set of registers are those registers which the program executing on the data processing unit is using as source and destination registers for data values. In one embodiment, the holding register may be entirely separate to the register file, whilst in alternative embodiments the holding register may be within the register file, but not one of the working set of registers. Whichever approach is taken, it will be appreciated that the holding register does not exist in the programmer's view of the system.

In accordance with the present invention, the data processing unit makes use of this holding register when executing preload instructions and subsequent load instructions. In particular, when executing a preload instruction, the data processing unit issues a preload memory access request to the memory system to cause the required data value to be located in the memory system, linefilling into the layer one level if not already there, but in addition further causes a copy of that data value to be loaded from the memory system into the holding register if predetermined criteria are met. In that event associated identifier data is also stored in the holding register. Hence, the memory system can react to the preload instruction in the usual manner, but additionally the data value and associated identifier data can be selectively stored within the holding register for subsequent use by the data processing apparatus.

In particular, when a subsequent load instruction is executed, the data processing apparatus causes a comparison operation to be performed to determine whether identifier data derived from the load instruction matches identifier data stored in the identifier portion of the holding register. This will typically be the case if that load instruction is the load instruction that was associated with the preload instruction, and no intervening events have occurred which may affect the comparison. In the event of a match resulting from the comparison operation, the data value stored in the holding register can be made available to the data processing unit without requiring a memory access request to be issued to the memory system, and hence avoiding at that stage any performance hit that might otherwise result from performing a load operation with respect to the memory system. In this scenario, the data value stored in the holding register will also typically be written to the specified register file at some predetermined point. Only if there is not a match is the memory access request issued to the system to cause the identified data value to be made available to the data processing unit from the memory system.

Accordingly, it can be seen that through the use of such a holding register which can be used to selectively store a data value resulting from a preload instruction, and the use of a subsequent comparison operation during execution of a load instruction, the performance impact that might otherwise result from the load operation can be avoided in the event that the data value is determined to already be present within the holding register. This invention hence enables a significant performance benefit to be realised by the data processing apparatus.

In one embodiment, in the event of a match resulting from the comparison operation, the data value, stored in the holding register is made available to the data processing unit by causing the data value to be transferred into a specified register of the register file. However, in some embodiments, it may not be appropriate for the data values to be transferred to the specified register of the register file as soon as it is determined that that data value is present within the holding register. For example, the data processing apparatus may be arranged such that data values have to be written to the register file in a particular order, and in that event it may be appropriate to defer the transfer of the data value to the register file for some predetermined amount of time.

Additionally, or as an alternative to forwarding the data value to the register file, in embodiments where the data processing unit is a pipelined data processing unit, then in the event of a match from the comparison operation, the data value stored in the holding register may be made available to the data processing unit by causing the data value to be output over a path to a predetermined pipeline stage of the data processing unit. In such pipelined data processing units, such an approach can further increase performance by avoiding the need for the data value to be loaded into the register file before it can be used by a subsequent instruction.

The holding register may take a variety of forms. However, in one embodiment, the holding register has a contents valid field indicating whether the contents of the holding register are valid, and if the contents valid field indicates that the contents of the holding register are not valid, the data processing unit is responsive to the load instruction to issue the memory access request to the memory system without determining whether the identifier data derived from the load instruction matches the identifier data in the identifier portion of the holding register. Hence, through the use of the contents valid field, the comparison operation can be bypassed in situations where it is determined that the contents of the holding register are not valid, in which event the load instruction is executed in the standard manner and causes the normal memory access request to be issued to the memory system.

In one embodiment, the holding register further comprises a data valid field indicating whether the holding register contains a valid data value. It will be appreciated that it is possible to start populating the holding register before the associated data value has necessarily become available from the memory system, and hence as an example certain parts of the identifier portion of the holding register may contain valid information prior to the data value being available for storing within the holding register. In such an event, the contents valid field can be set to indicate that the holding register contains valid data, whilst the separate data valid field will only be set when the data portion of the holding register validly stores the associated data value.

There are a number of ways in which the contents of the holding register may be invalidated. In one embodiment, the contents of the holding register are invalidated if any intervening event that occurs after the preload instruction is executed but before the load instruction is executed is one of a number of predetermined types of event, said types of event being events which make it inappropriate to consider relying on the contents of the holding register when executing the load instruction. In this embodiment, it is realised that it may not be appropriate to use the holding register's copy of the data value when executing a subsequent load instruction if an intervening event could affect the matching process, or could affect the data value itself.

It will be appreciated that the persistence of data in the holding register can be made conservative/pessimistic enough so that the implementation is completely transparent to the program. For example, the holding register can be invalidated in the event of any intervening store or swap instructions which could write to the address whose data has been preloaded, any intervening interrupts or other exceptional conditions, any intervening debug events, etc. Other situations where the holding register could be invalidated are where an access is made to a control coprocessor, since such a control coprocessor may react to such accesses by turning the cache on or off, or performing other actions which could make it inappropriate to rely on the holding register's copy of the data value. It may also be appropriate in some embodiments to invalidate the contents of the holding register if any intervening load instructions are executed which are not associated with the preload instruction, or if any intervening branch mispredictions are detected with regards to branch instructions.

In an alternative embodiment, or in addition to the above instances where the holding register may be invalidated, the contents of the holding register may be invalidated a predetermined number of clock cycles after the data value is stored in the holding register. Hence, in such an embodiment, it might generally be considered that the contents of the holding register can only be assumed to be valid for a period of a certain number of clock cycles, for example ten clock cycles, after which the contents will be considered to be invalid. For example, it may be considered appropriate when programming to have some upper limit on the separation between a preload instruction and its associated load instruction, which will equate to a certain maximum number of clock cycles separation. If that number of clock cycles is exceeded, it can be assumed that some branch or the like has taken place resulting in some other thread of execution taking place, and that as such the contents of the holding register should not be relied upon. Accordingly, in such embodiments, the performance benefits realised by the holding register will only be available if the associated load instruction follows shortly after the preload instruction.

The predetermined criteria employed to determine whether to cause the data value identified by the preload instruction to be loaded from the memory system into the holding register can take a variety of forms. However, in one embodiment, the predetermined criteria comprises an indication of the availability of the data value from the memory system. For example, if the data value is available relatively quickly from the memory system, for example if it is located in the layer one cache of a hierarchical memory system, then it may be considered appropriate to also store the data value in the holding register, whereas if a cache miss occurs in the layer one cache, thereby requiring a linefill process to be performed within the memory system, it may be considered not appropriate to store the data value in the holding register, but instead for the data processing apparatus to continue its normal operation without awaiting the return of the data value to the holding register.

In an alternative embodiment, the predetermined criteria employed to determine whether to cause the data value identified by the preload instruction to be loaded from the memory system into the holding register comprises a determination as to whether, if the preload instruction were a load instruction, an abort would be generated as a result of the associated memory access request. If it is determined that the memory accessed would return a data abort in such a situation, then it can be determined not to write the data into the holding register, as a result of which when the associated load instruction is later executed, the abort will be taken then.

It will be appreciated that the benefits of the present invention may be realised even in embodiments where the memory system is not a hierarchical memory system since if the required data value can be copied into the holding register at the time the preload instruction is executed, then it will facilitate a significant performance improvement for the subsequent load instruction irrespective of the architecture of the memory system. However, in one embodiment, the memory system is a hierarchical memory system, and the preload memory access request issued by the data processing unit in response to a preload instruction is operable to cause the data value identified by the preload instruction to be transferred to a predetermined hierarchical level of the memory system. More particularly, in one embodiment, the predetermined hierarchical level is a cache of the memory system.

It will be appreciated that whilst in some embodiments the presence of a single holding register will be sufficient to provide significant performance benefits, it is possible in alternative embodiments to provide a plurality of such holding registers in order to enable a plurality of data values to be temporarily stored. Typically, in such embodiments, each such holding register will have its own associated valid field(s) and the comparison operation performed will be with respect to the contents of any valid holding register.

The comparison operation may be implemented in a variety of ways. However, in one embodiment, the data processing apparatus further comprises first comparison logic operable during the comparison operation to compare a first portion of the identifier data with corresponding identifier data derived from the load instruction in order to determine whether the data value temporarily stored in the holding register might be the data value identified by the load instruction. Hence, the purpose of this first comparison logic is not to determine for certain whether the data value held in the holding register can be used as the response for the load instruction, but instead to determine whether the data value held in the holding register is a candidate for such use. Typically, the comparison operation performed by the first comparison logic will be performed at an early stage of execution of the load instruction, for example during a decode stage.

In one embodiment, the first portion of the identifier data comprises addressing mode data. It will be appreciated that load instructions may use a variety of different addressing modes. However, it is envisaged that a load instruction and its associated preload instruction will use the same addressing mode, and accordingly a comparison of the addressing mode will provide a good indication as to whether the holding register might contain the required data value. In embodiments where the effective address for a memory access is computed by adding an offset value to a base address stored within a particular register, the addressing mode will typically identify the register number containing the base address, and the offset value.

In an alternative embodiment, the first portion of the identifier data comprises a destination register identifier identifying the destination register for a load instruction associated with the preload instruction. This embodiment can be used in situations where the preload instruction is arranged to replicate within the preload instruction the destination register that will be used by the subsequent load instruction.

In an alternative embodiment, it will be appreciated that the first portion of the identifier data could be some subset of the bits constituting the addressing mode data or the destination register identifier, this enabling a faster, albeit less accurate, initial indication as to whether the data value temporarily stored in the holding register might be the data value identified by the load instruction.

In one embodiment, the data processing apparatus further comprises second comparison logic operable during the comparison operation to compare a second portion of the identifier data with corresponding identifier data derived from the load instruction in order to determine whether the data value temporarily stored in the holding register is the data value identified by the load instruction. Hence, in contrast to the first comparison logic, the second comparison logic is used to actually identify whether the data value temporarily stored in the holding register is the data value identified by the load instruction. Typically, the second comparison logic is used at a later stage in execution of the load instruction than that during which the first comparison logic is used but still at an early enough stage that the load penalty can be avoided if the data value stored in the holding register is determined to be the required data value for the load instruction.

In one embodiment, the second comparison logic is only employed if the first comparison logic indicates that the data value temporarily stored in the holding register might be the data value identified by the load instruction. By this approach, any unnecessary use of the second comparison logic can be avoided, thereby saving power. Further, such an approach may avoid any timing penalties associated with delaying issuing the associated real load instruction pending the outcome of the comparison performed by the second comparison logic.

In one embodiment, the second portion of the identifier data comprises data from which a memory address for a memory access request is derivable. Hence, in the earlier mentioned example where the addressing mode involves adding an offset to a base address, the identifier data may comprise both the base address and the offset value used by the preload instruction. In an alternative embodiment, the second portion of the identifier data actually comprises the memory address for the preload memory access request. However, it will be appreciated that the former approach, whereby the constituent data required to generate the preload memory address is used for the comparison process, has the benefit that the comparison process performed by the second comparison logic can be performed without waiting for the actual memory address for the real load instruction to be generated.

In one embodiment, the data processing apparatus further comprises third comparison logic operable for every intervening instruction that is to be executed after the preload instruction is executed but before the load instruction is executed, to compare a destination register for each such intervening instruction with a base register identifier provided within the identifier data of the holding register, the base register identifier identifying a base address from which a memory address for a memory access request is derivable, in the event that the destination register matches the base register identifier, the third comparison logic being operable to issue an invalidate signal operable to cause the contents of the holding register to be invalidated. Hence, in such embodiments, the third comparison logic looks for situations where instructions may modify the base address that will be required by the subsequent load instruction, and on detection of such an event issues an invalidate signal to cause the contents of the holding register to be invalidated. This hence avoids any comparison process being performed with regards to contents of that holding register and instead allows the load instruction to proceed in the usual manner by issuing a memory access request to the memory system. It will be appreciated that in embodiments where multiple holding registers are used, the third comparison logic will typically be arranged to compare the destination register for each intervening instruction with the base register identifier provided within any valid holding register.

Another benefit of such an approach is that if it is known that the base address has not been updated, then there is no need to use the second comparison logic to perform an address comparison. For example, if the preload instruction PLD [R0, #offset] is executed and it is determined that R0 has not been modified, then for a subsequent load instruction it is sufficient just to compare the addressing mode using the first comparison logic to determine whether the load instruction is seeking to access the data that is held in the holding register, e.g. it can be determined that LDR R3, [R0, #offset] is seeking to access such data just by comparison of the addressing mode (the label [R0, #offset] being the addressing mode).

It will be appreciated that the data processing unit can take a variety of forms. However, in one embodiment, the data processing unit comprises a state machine having a plurality of slots, when an instruction is to be executed by the data processing unit that instruction being allocated to an available slot, each slot having a plurality of interconnected states, and the state machine being operable to pass the allocated instruction through a sequence of said states of the slot during execution of the allocated instruction, when a preload instruction has completed execution the state machine being operable to cause that preload instruction to continue to occupy the slot such that when a subsequent load instruction is detected as being associated with that preload instruction, that subsequent load instruction is allocated to the same slot already occupied by the preload instruction.

In one embodiment, such a state machine may reside within a load-store unit of the data processing unit. Typically, as instructions enter the load-store unit, they are allocated to a free slot within the state machine, and when each instruction finishes execution, it usually returns to an idle state, whereby the slot is vacated for use by a subsequent instruction. However, in the above embodiment, the preload instruction does not move back to the idle state when it completes, but instead continues to occupy the slot such that when a subsequent load instruction is detected as being associated with that preload instruction, that subsequent load instruction is allocated to the same slot. In one implementation of such an approach, it is envisaged that the preload instruction will be evicted from the slot prior to receipt of the associated load instruction if an intervening instruction is received for which there is no free slot available. This avoids any unnecessary pipeline stall from occurring.

In one particular embodiment, the preload instruction is arranged to continue to occupy the slot by moving to a predetermined state when execution of the preload instruction has completed, the subsequent load instruction that is detected as being associated with that preload instruction being arranged to enter the slot at that predetermined state.

Hence, in accordance with such embodiments, the slot selection algorithm of the state machine is modified so that a load instruction will preferentially get allocated to a slot that is in the predetermined state and has the same destination register as the load instruction. Accordingly, the preload instruction can be thought of as reserving the load instruction a slot, and optionally having the load instruction's data ready and waiting.

Viewed from a second aspect, the present invention provides a method of operating a data processing apparatus, the data processing apparatus comprising a data processing unit operable to execute instructions, a register file having a plurality of registers operable to store data values accessible by the data processing unit when executing said instructions, and a holding register not forming one of a working set of registers of the register file and operable to temporarily store a data value, the holding register having a data portion for storing the data value, and an identifier portion operable to store identifier data associated with the data value, the method comprising the steps of: responding to a preload instruction by: (a) issuing a preload memory access request to a memory system to cause a data value identified by the preload instruction to be located in the memory system; and (b) dependent on predetermined criteria causing a copy of that data value along with associated identifier data to be loaded from the memory system into the holding register; and responding to a load instruction by: (i) performing a comparison operation to determine whether identifier data derived from the load instruction matches the identifier data in the identifier portion of the holding register; (ii) in the event of a match causing the data value stored in the holding register to be made available to the data processing unit without requiring a memory access request to be issued to the memory system; and (iii) in the event of no match issuing the memory access request to the memory system to cause a data value identified by the load instruction to be made available to the data processing unit from the memory system.

BRIEF DESCRIPTION OF THE DRAWINGS

The present invention will be described further, by way of example only, with reference to preferred embodiments thereof as illustrated in the accompanying drawings, in which.

DESCRIPTION OF PREFERRED EMBODIMENTS

Figure 1:
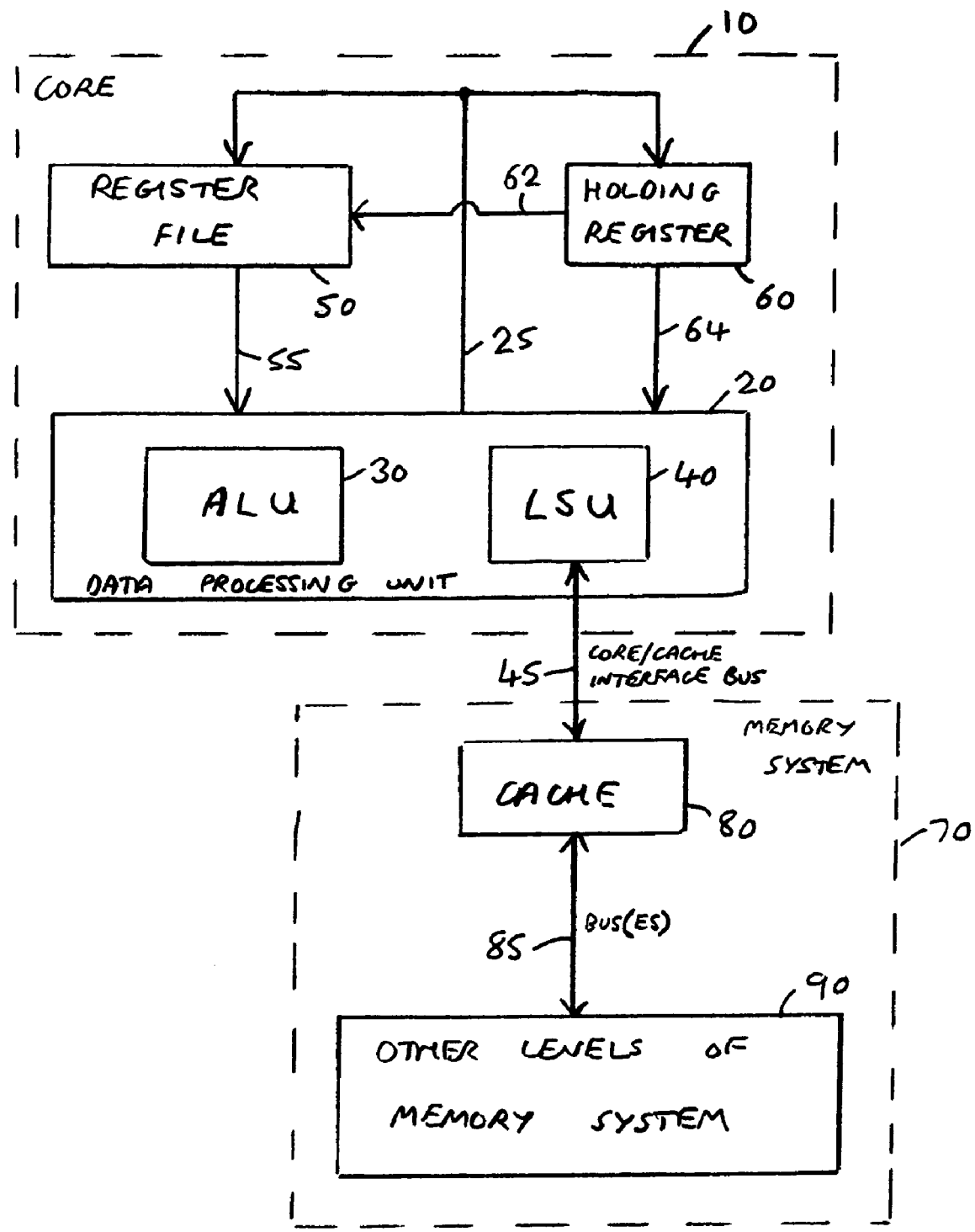
FIG. 1 is a block diagram of a data processing system in accordance with one embodiment of the present invention.

FIG. 1 is a block diagram of a data processing system showing the relevant components employed in accordance with one embodiment of the present invention. In particular, the data processing system has a processor core 10, also referred to herein as a data processing apparatus, which contains a data processing unit 20 and a register file 50. The data processing unit 20 may be a pipelined data processing unit, and will typically include a number of functional units therein used to perform different functions. For example, the data processing unit 20 may include an Arithmetic Logic Unit (ALU) 30 used to perform arithmetic operations upon data values, and in addition may include a Load-Store Unit (LSU) 40 used to load data values from memory system 70 into the register file 50, or to store data values from the register file 50 to the memory system 70.

Typically, the register file 50 will contain a relatively small number of working registers, for example 16 registers, and the instructions executed by the data processing unit 20 will manipulate data values stored within the working registers of the register file 50. The instructions will specify the relevant source and destination registers for the data values. When the data processing unit 20 is executing instructions, it will typically read the required input data values from the register file 50 over path 55, and any resultant data value will be output over path 25 back to the register file 50 for storing in a specified destination register.

Since the data values need to be present in the register file 50 before they can be manipulated by the data processing unit 20, this means that there will typically be a significant number of load and store operations that need to be executed by the LSU 40 in order to load required data values from the memory system 70 into the register file 50, and subsequently store data values from the register file 50 into the memory system 70 when those data values are no longer required by the data processing unit 20 or the registers are needed for other calculations.

Since it generally takes a significant time to load data values from the memory system 70 and/or store data values to the memory system 70, it is known to arrange the memory system in a hierarchical manner in order to seek to reduce this load latency wherever possible. In particular, it is known to provide as a layer one of the memory system a cache 80 with which the LSU 40 can communicate via the core/cache interface bus 45. If, considering a load operation, the required data value is within the cache 80, then it can be retrieved from the memory system relatively quickly, but if the data value is not within the cache, then a cache miss will occur which will typically result in a linefill process being performed within the cache 80 during which the required data value, and typically a cache line's worth of data values including the required data value, is loaded into the cache 80 from the other levels of the memory system 90 via one or more buses 85. It will be appreciated that in the event of a cache miss, the time taken for the load operation will be significantly longer than would otherwise be the case if the data value were already within the cache 80.

With this in mind, it is known to provide within the instruction sequence to be executed on the core 10 one or more preload instructions, each preload instruction being associated with a load instruction, and appearing at an earlier point within the code than the associated load instruction. When a preload instruction is executed by the core 10, this will cause a preload memory access request to be issued over path 45 to the cache 80. If the identified data value the subject of that preload memory access request is already present in the cache, then no action is required. However, if the data value is not present in the cache, then the memory system 70 can be arranged to react to this preload memory access request by performing a linefill process in order to populate the cache 80 with the required data value. The aim of this process is hence that once the subsequent associated load instruction executes, the required data value will already be within the cache 80, and accordingly the load latency can be reduced. Typically, once the core 10 has issued the preload memory access request, it takes no further action with regards to the preload instruction, and instead treats the preload instruction as a NOP (i.e. no update of the core's architectural state takes place).

Whilst the above known approach can assist in reducing the load latency, it has been found that the time taken to perform load operations, even when the data is already within the cache 80, can still have a significant impact on the performance of the core, this becoming increasingly more marked as the core is operated at higher frequencies, and as the pipeline depths of the units within the processor core increases.

In accordance with embodiments of the present invention, this impact on performance is alleviated through the use of a holding register 60 provided within the core 10, which does not form one of the registers of the register file, and accordingly is not seen in the programmer's view of the system. When the memory system processes a preload memory access request, it is now arranged to make the required data value available to the core 10 over bus 45, in effect treating the preload memory access request just like any other memory access request issued by the LSU 40.

In accordance with embodiments of the present invention, the core 10 is arranged to selectively store within the holding register 60 the data value returned by the memory system, and in particular the returned data value can be passed by the LSU 40 over path into the holding register 60. As will be discussed in more detail later, when the subsequent associated load instruction is executed, then provided that it is determined that the contents of the holding register accurately reflect the data required by the load instruction, then that data can be output over path 62 to the register file 50, and/or over path 64 to the data processing unit 20 without the need to issue a memory access request over path 45 to the memory system 70. Accordingly, this enables the time penalty associated with the load operation to be avoided in situations where the data value is already present within the holding register 60.

Figure 2:
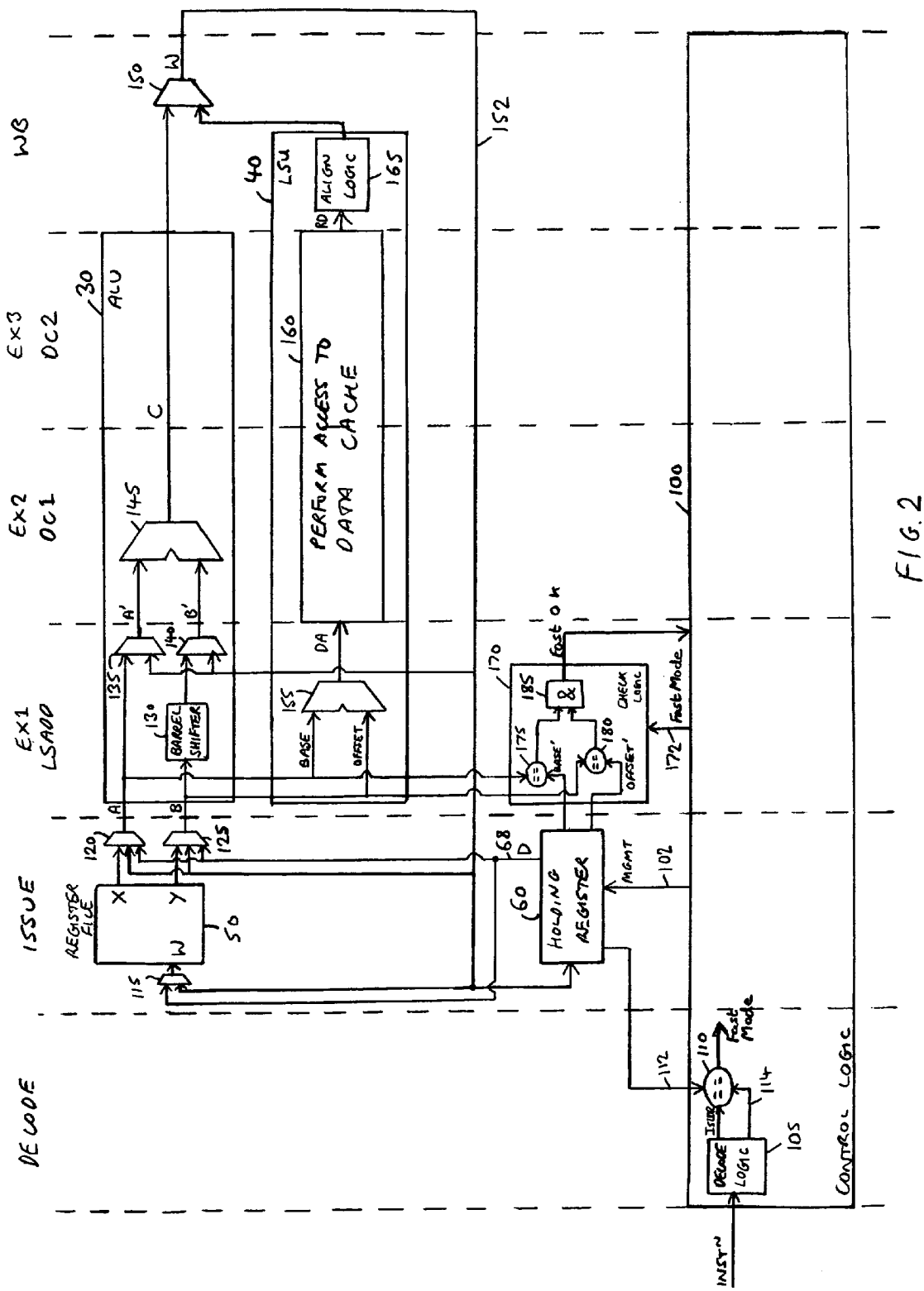
FIGS. 2, 3 and 4 are block diagrams illustrating three different embodiments of the present invention.

FIG. 2 is a block diagram illustrating in more detail components provided within the core 10 in order to implement the holding register 60 in the above-described manner. The vertical dotted lines in FIG. 2 are intended to illustrate the separation between the various pipeline stages of the core. Both the ALU 30 and the LSU 40 can be considered as having common decode and issue stages. After the issue stage, an instruction to be handled by the LSU 40 will enter an LSADD stage, followed by DC1, DC2 and WB stages. Similarly, an instruction to be handled by the ALU 30 will enter the EX1 stage of the ALU pipeline, followed by the EX2, EX3 and WB stages. As schematically illustrated in FIG. 2, the main functional portion of the ALU pipeline 30 can be considered to exist in the EX1, EX2 and EX3 stages, whilst the main functional portion of the LSU pipeline 40 can be considered to exist in the LSADD, DC1, DC2 and WB stages.

As can be seen from FIG. 2, the register file 50 is able to provide via multiplexers 120 and 125 two operands to either the ALU 30 or the LSU 40. In the standard manner, the ALU 30 is provided with a barrel shifter 130 which can operate on one of the operands, and an adder 145 for adding together the two operands to produce an output from the ALU 30. This output is then routed via the multiplexer 150 over return path 152, where it can then be stored within the register file 50 via the multiplexer 115. As also shown in FIG. 2, the data output over path 152 is additionally routed to the inputs of multiplexers 120, 125, 135 and 140 to enable that data to be used in a subsequent ALU operation without incurring the delay of having to first route it via the register file 50.

As will be appreciated by those skilled in the art, there are a number of different addressing modes that may be used in load instructions. For example, in one addressing mode, the address for the data value may be specified directly by the contents of a single register. In an alternative addressing mode, the address for the data value is determined by adding together the contents of two registers. However, in the example illustrated in FIG. 2, it will be assumed that the addressing mode specifies that the address for the data value to be loaded is determined by adding an offset value specified as an immediate value within the load instruction to the contents of a register storing a base address value.

Hence, as shown in FIG. 2, the LSU 40 is arranged to receive the base and offset values and to add them together within the adder 155 in order to produce an address for the data value (DA), which is then issued to the data cache 80 illustrated in FIG. 1. The access to the data cache 160 will typically take a number of clock cycles, after which the required data value (RD) is received by the LSU 40, and in particular by alignment logic 165 within the LSU 40. As will be appreciated by those skilled in the art, the alignment logic 165 is operable to perform any required alignment function to align the data value with a word boundary, etc, after which the aligned data value is then returned via multiplexer 150 over return path 152. As with the output from the ALU 30, this returned data value can be stored into the register file 50 via multiplexer 115, and can also be returned as an input to the multiplexers 120, 125, 135 and 140 to allow its immediate use as an operand of a subsequent instruction.

In accordance with embodiments of the present invention, a holding register 60 is also provided which is connected to the return path 152, and can be selectively arranged under the control of one or more management signals output by the control logic 100 over path 102 to store the data value returned over that return path 152.

Figure 7:
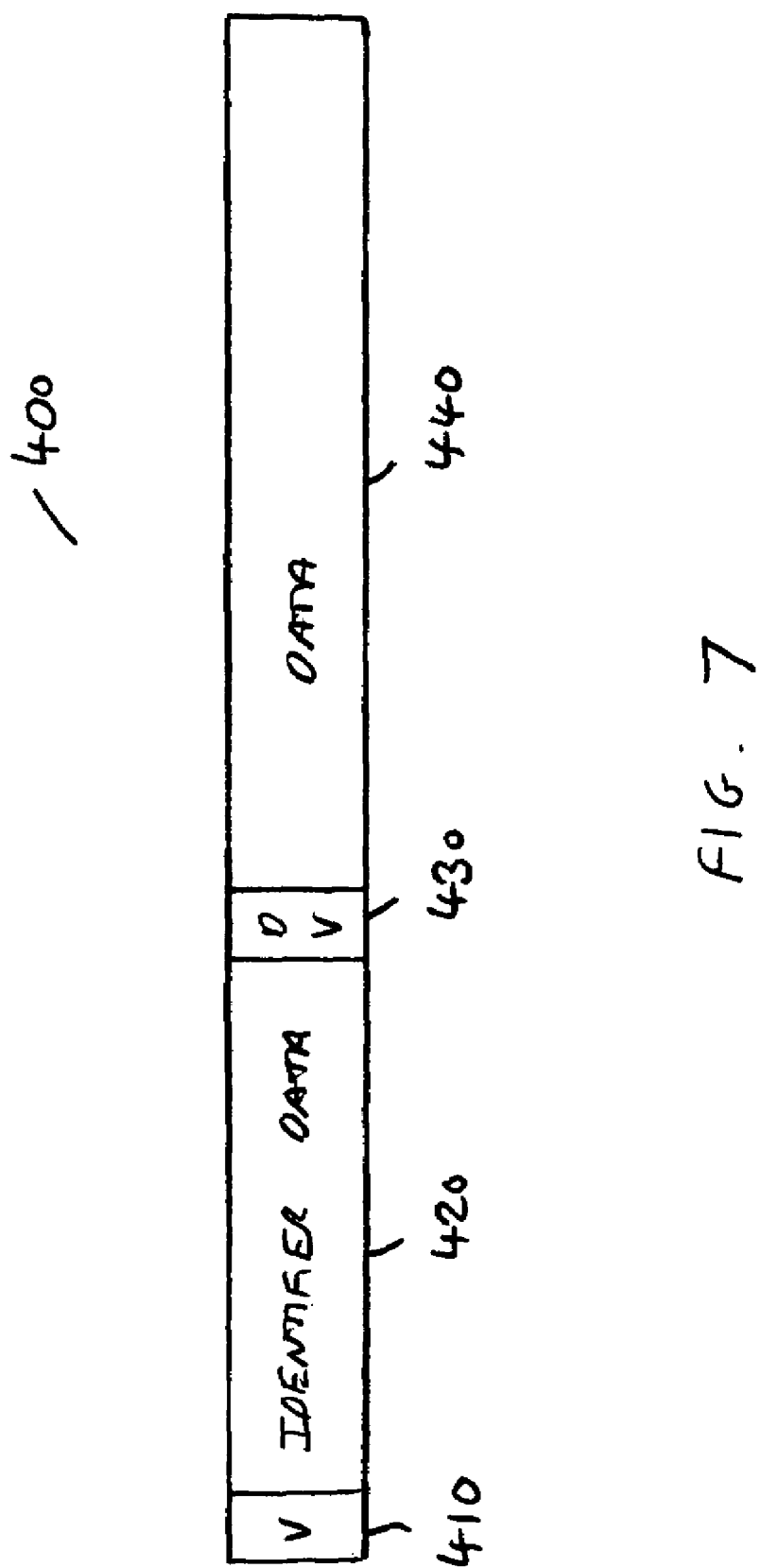
FIG. 7 is a diagram illustrating the format of a holding register in accordance with one embodiment of the present invention.

The holding register may be arranged as illustrated in FIG. 7, and in particular may include an identifier portion 420 containing one or more pieces of identifier data used to identify the contents of that holding register, and a data portion 440 used to store a data value received via path 152. As will be apparent from the following discussions, the identifier portion 420 may contain a number of different pieces of identifier data which are used at various pipeline stages to determine correspondence between the data value stored in the data portion and the data value required by a load instruction. In particular, in embodiments of the present invention, the identifier portion 420 may contain one or more of the following items of data:

an addressing mode indication;
an indication of a base address and an offset value;
an indication of an effective address of a memory access request; and/or
an indication of a destination register for the associated load instruction.

In one embodiment of the present invention, the holding register 60 also includes a contents valid flag 410 (which may for example be a single bit field) used to indicate whether the contents of the holding register are valid. Additionally, as an optional feature, the holding register may include a data valid flag 430 (which may for example be a single bit field) used to identify whether the data value contained within the data portion 440 is valid. This can be useful, since it will be appreciated that the data value may only be made available to the holding register 60 some number of clock cycles after the identifier data 420 may be entered within the holding register, as will be discussed in more detail below.

In particular, decode logic 105 within the control logic 100 decodes each received instruction. If it is determined that the instruction is a preload instruction, then a signal can be sent over path 102 to the holding register 60 to cause the identifier portion 420 to be populated with certain identifier data, and to cause the valid flag 410 to be set to show that the contents are valid. Predetermined criteria can then be used to determine whether to store within the holding register 60 the data value subsequently returned from the memory system, and output over path 152. For example, the control logic 100 may decide that the data should be stored in the holding register if a cache hit occurs within the memory system, and accordingly the data is returned relatively quickly from the memory system, whilst in the event of a cache miss, the control logic 100 may decide not to store the data value within the holding register 60. Alternatively, or in addition, the control logic 100 may be arranged such that in the event that a protection fault is detected (typically by a memory management unit (MMU) associated with the cache 80), the returned data value is not stored within the holding register 60. If the control logic decides not to store the data value within the holding register, then it will typically reset the valid flag 410 to show that the holding register does not contain valid data. However, assuming that the data value is stored within the holding register, then when the data value is written into the data portion 440, the corresponding data valid bit 430 will be set by the control logic 100 over path 102.

It will be appreciated that whilst a single holding register 60 is shown in FIG. 2, a plurality of such holding registers can be provided, such that multiple data values can be temporarily stored within the holding registers for subsequent use by the data processing apparatus. In the event that multiple holding registers are provided, then on the detection of a preload instruction, the control logic 100 will preferably assign a new entry to a holding register that does not contain any valid data. In the event that all of the holding registers currently contain valid data at the time a new preload instruction is received, then it will be appreciated that there are a number of update policies that could be applied. For example, in one embodiment, the oldest holding register entry could be overwritten, the control logic 100 could allocate a random entry to be overwritten, or alternatively the control logic 100 may decide not to allocate a holding register entry to the newly received preload instruction.

When a subsequent load instruction is received, this will be detected by the decode logic 105 within the control logic 100, and will cause a signal to be issued to a first piece of comparison logic 110 within the control logic, which is used to determine whether the content of any valid holding register may contain the data value required by the load instruction. To perform this comparison, the holding register 60 is arranged to receive certain identifier data from the identifier portion 420 of the holding register, this data being received over path 112, whilst at the same time corresponding identifier data from the load instruction is received over path 114. The comparison logic 110 is then arranged to determine whether there is a match between the identifier data received over path 112 and the identifier data of the load instruction received over path 114, and in the event of a match issues a "FastMode" signal which is set to indicate that the data value in the holding register may be the data value required by the load instruction.

In one embodiment, the identifier data compared by the comparison logic 110 is addressing mode data, and accordingly in the example illustrated in FIG. 2 will include the identity of the register containing the base address, and an indication of the offset value. It will be appreciated that this information will be available very early on during the execution of the load instruction, and hence provides appropriate information for comparison by the comparison logic 110. Whilst it will be appreciated that this information may not guarantee that the data value in the holding register is that required by the load instruction, it does indicate that the data value might potentially be the required data value, and hence serves as an early indicator of a potential match.

In an alternative embodiment, the preload instruction is arranged to encode within it the destination register for the associated load instruction. This is not typically relevant to the preload instruction itself, since as mentioned earlier the core does not load the data into the register file when the preload instruction is executed, but only takes that step when the subsequent load instruction is executed. However, by replicating the destination register information within the preload instruction, this destination register data can be compared by the comparison logic 110 instead of the addressing mode data, since again this destination register information will be available very early on during the execution of the load instruction. In some instances, a comparison of the destination register can provide a more accurate indication of the potential match of the data value in the holding register with the data value required by the load instruction, as can be illustrated by the following example:

LDR R1, [R0,], #4
LDR R2, [R0,], #4

The first of these load instructions is arranged to cause the data identified by the address in register R0 to be loaded into register R1, whereafter the address in register R0 is incremented by four. Similarly, it can then be seen that the second load instruction loads the data found at the updated address in register R0 into the register R2, whereafter the address in register R0 is incremented by four. If for both of these load instructions, a corresponding preload instruction is inserted into the code at an earlier point in the code sequence, then it can be seen that the addressing mode for both of these load instructions is the same, namely "[R0,], #4". Hence, if the comparison logic 110 is arranged just to compare the addressing mode, it might incorrectly set the FastMode signal, since it may detect correspondence between the first preload instruction and the second load instruction, or between the second preload instruction and the first load instruction. However, if instead the destination registers are compared, it can be seen that this possible ambiguity will not occur, since now the comparison logic 110 will correctly associate the first preload instruction with the first load instruction specifying a destination register of R1, and will correctly associate the second preload instruction with the second load instruction having a destination register R2.

Whichever of the above approaches is taken, it will be appreciated that a set FastNode signal will be issued in the event that the comparison logic 110 detects a match between the identifier data received over path 112 and the identifier data from the load instruction received over path 114. In the event that there are multiple holding registers, it will be appreciated that the comparison operation performed by the comparison logic 110 would be replicated for each holding register containing valid data.

In the FIG. 2 embodiment, a second piece of comparison logic 170 is also provided which includes comparison logic 175 for comparing the base address data held within the identifier data 420 of the holding register with the actual base address for the load instruction, this being available when the load instruction enters the LSADD stage of the LSU pipeline. Similarly, comparison logic 180 compares the offset value stored within the identifier data of the holding register with the corresponding offset value of the load instruction. In the event that both the comparison logic 175 and the comparison logic 180 detect a match, this will be detected by the AND gate 185, which in that instance will then issue a "Fast Ok" signal which is set to indicate that the data value stored within the holding register is the data value required by the load instruction.

As can be seen from FIG. 2, the second comparison logic 170 is only triggered in the event that the FastAode signal is set, this information being passed to the second comparison logic 170 over path 172. As with the comparison performed by the first comparison logic 110, the comparison performed within comparison logic 170 will again only be performed if the contents of the holding register 60 are still considered valid at the time.

If the Fast Ok signal is set, then this will cause the control logic 100 to issue a signal to the relevant holding register over path 102 to cause the data value stored in the holding register to be output over path 68, from where it can be input to the register file 50 via multiplexer 115, and/or is routed to the inputs of multiplexers 120 and 125 to enable that data to be used immediately within a subsequent operation.

Figure 3:
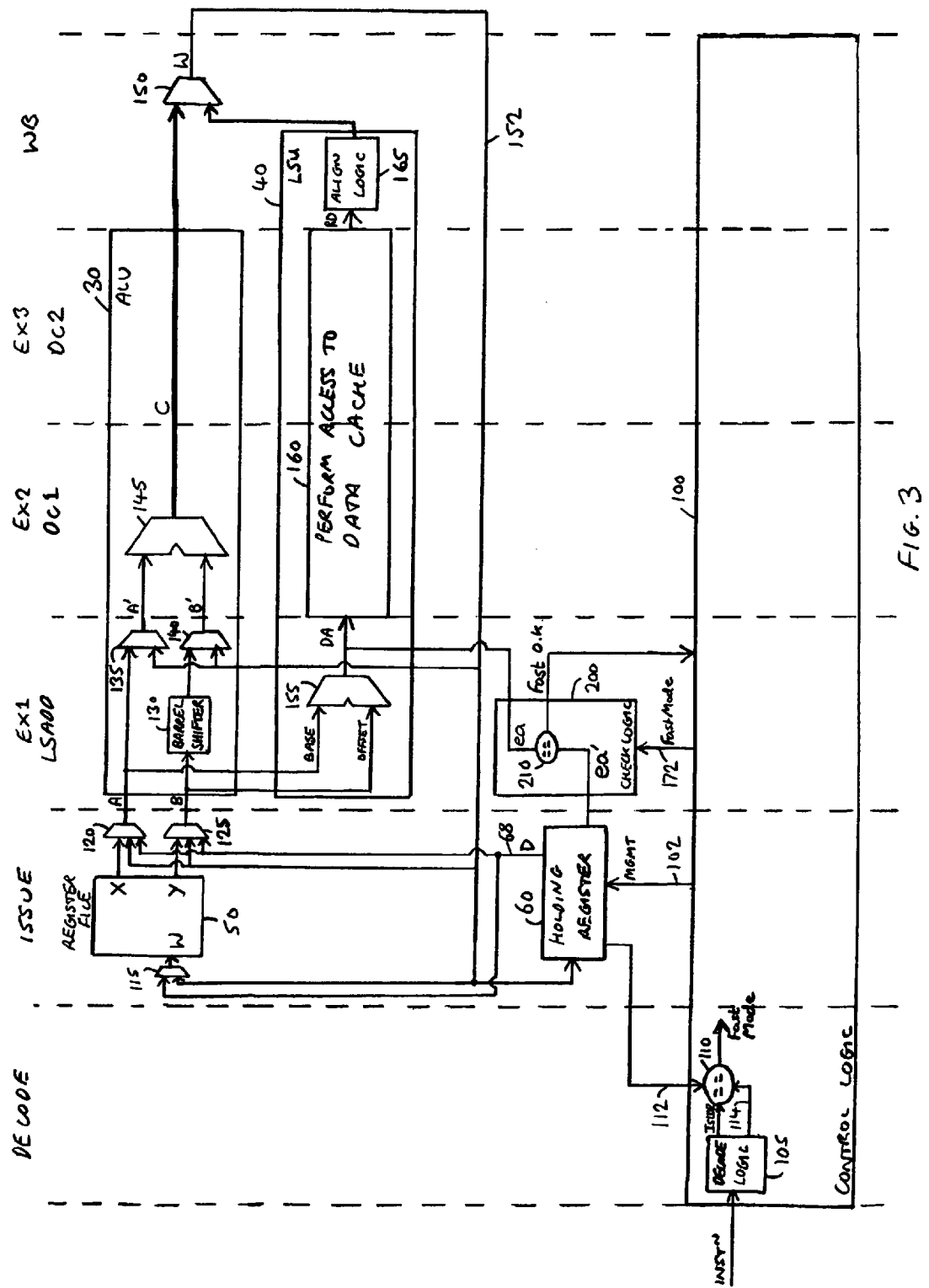

FIG. 3 illustrates an alternative embodiment of the present invention, in which the second comparison logic 170 is replaced by a different form of second comparison logic 200. Other than this change, the data processing apparatus is the same as that illustrated in FIG. 2. The holding register 60 now stores within the identifier data 420 the effective address associated with the data value stored in the data portion 440, and this effective address is compared by the compare logic 210 with the actual effective address "ea" (also referred to herein as DA) output by the adder 155 of the LSU 40. In the presence of a match being detected by the compare logic 210, then the Fast Ok signal is set to cause the data value within the holding register to be output over path 68. Whilst the second comparison logic 200 of FIG. 3 is less complex than the second comparison logic 170 of FIG. 2, it has the slight disadvantage that the effective address needs to be calculated by the adder 155 before the comparison can take place. This can hence slow down slightly the detection of the presence of the required data value within the holding register 60, whereas when employing the FIG. 2 approach, this detection can take place without waiting for the adder 155 to compute the effective address. Accordingly there is the potential for a greater time saving to be achieved when employing the approach of FIG. 2.

In both the FIG. 2 and FIG. 3 embodiments, it will be appreciated that if there are multiple holding registers 60, then the comparison process performed by the second comparison logic 170, 200 would be replicated for any valid holding register that had resulted in the generation of a set FastNode signal by the first comparison logic 110.

Figure 4:
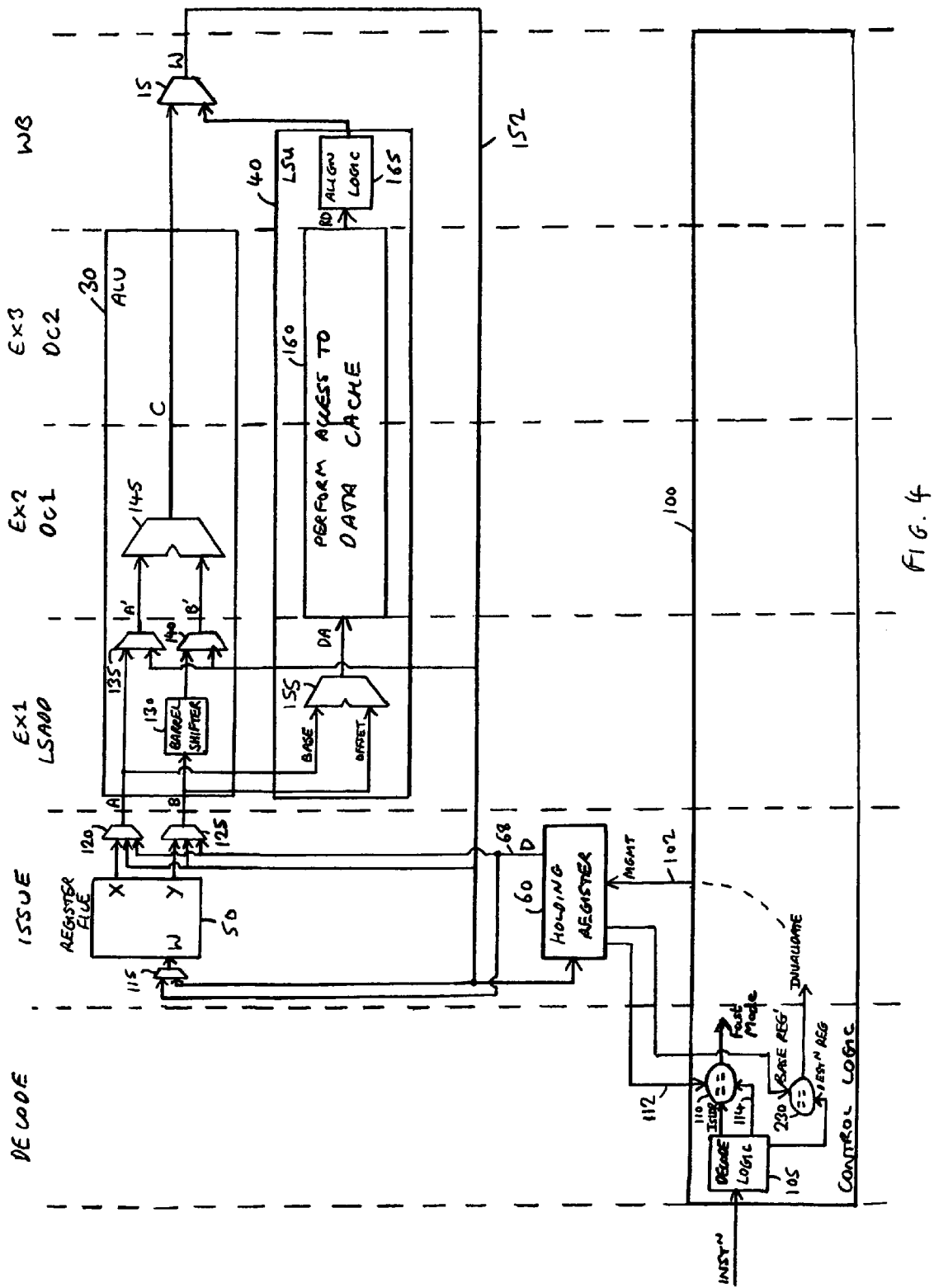

FIG. 4 illustrates a third embodiment of the present invention, in which the need for second comparison logic utilised at the LSADD stage is removed. In this embodiment, a third piece of comparison logic 230 is introduced into the control logic 100 which is arranged to compare the destination register for every instruction occurring after the preload instruction with the base register identifier stored within the holding register 60. In the event of the comparison logic 230 detecting a match, this indicates that an intervening instruction (i.e. an instruction after the preload instruction but before the associated load instruction) is attempting to update the register that is used as the base register for the subsequent load instruction, and in this event it is appropriate to invalidate the contents of the holding register. Accordingly, in the event of a match, the comparison logic 230 issues an invalidate signal which is output via path 102 to the holding register to invalidate the entry in the holding register.

Assuming the contents of the holding register are still valid at the time the associated load instruction is received, then the first comparison logic can perform its usual compare process in an analogous manner to that described earlier with reference to FIGS. 2 and 3. However, in the event that a set FastMode signal is then generated, this itself indicates that the data value in the holding register is the data value required by the load instruction without the need for any subsequent check to be performed. The reason for this certainty at this stage is that it is known that no intervening instruction has altered the base address in the base register, and accordingly the data value is still that required by the load instruction.

Figure 5:
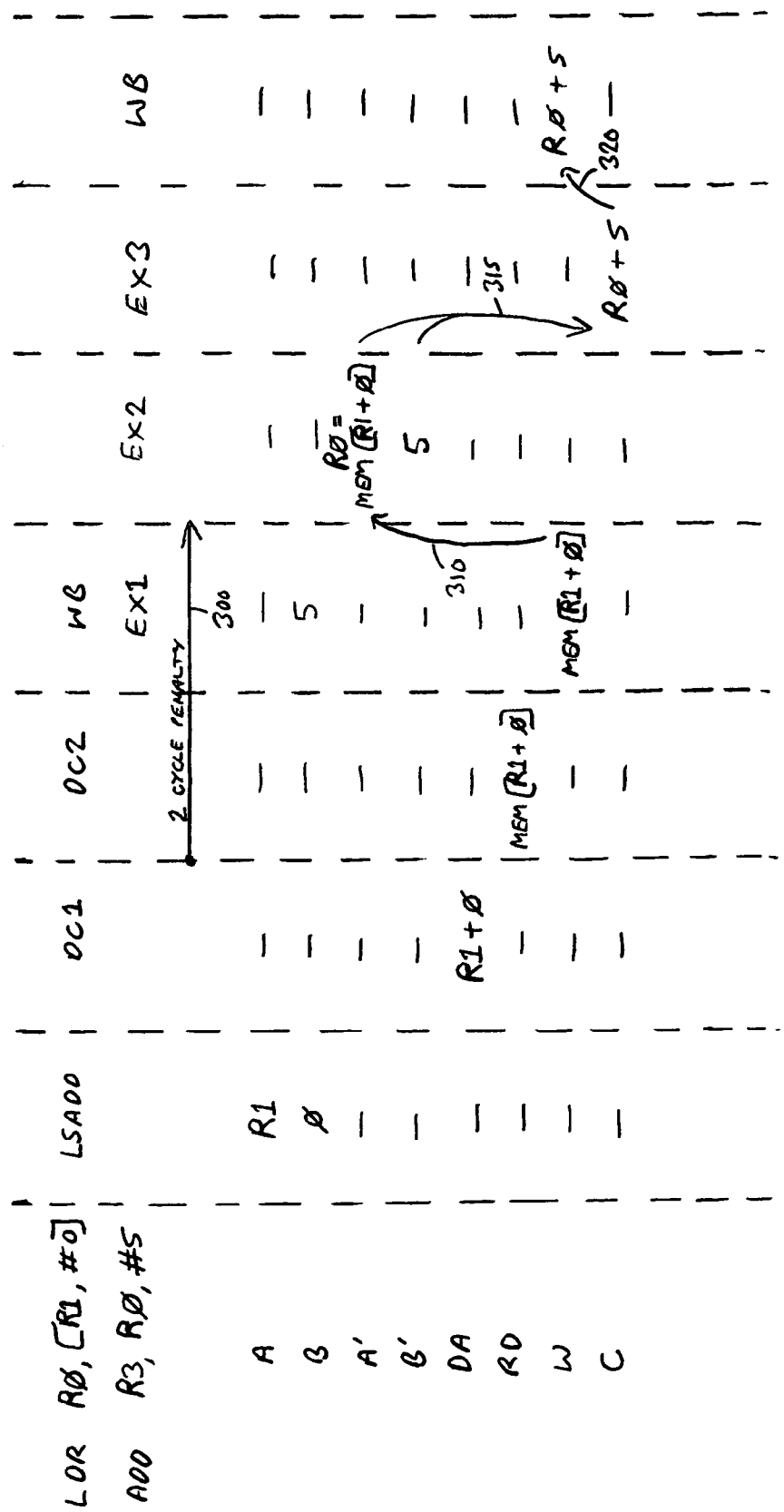
FIG. 5 is a timing diagram illustrating the execution of a load instruction followed by an add instruction within a known data processing system.

FIG. 5 is a timing diagram illustrating the timing of a load instruction followed by a subsequent add instruction when executed within a pipelined data processing unit such as that illustrated in FIG. 2, but in situations where the holding register 60 is either not present, or is not used. The load instruction is arranged to load into register R0 the data value located at the address given by adding the contents of register R1 to the offset value, in this example the offset value being 0. At the beginning of the LSADD stage illustrated in FIG. 2, the base address will appear at point A, and the immediate value 0 will appear at point B. At the beginning of the DC1 stage, the adder 155 will have generated the address for the load operation DA, this address being given by adding 0 to the contents of register R1. In the next cycle (the DC2 cycle), the required data value RD may be returned, thereby allowing that data value to be output at point W in the subsequent write back (WB) stage.

The subsequent add instruction is arranged to add 5 to the contents of register R0, and to place the result in the destination register R3. When this add operation enters the EX1 stage of the ALU pipeline 30, the immediate value 5 will be present at point B. However, the data value stored within register R0 will not yet be available, since it will only at this time be written back from the write back stage of the LSU pipeline. When the add instruction then enters the EX2 stage of the ALU pipeline 30, the data value to be stored in register R0 can be made immediately available at the point A', since the data value returned over path 152 can be routed via the multiplexer 135 directly to the input of the adder 145. This routing is indicated by the path 310 as illustrated in FIG. 5. The adder will then add together this data value and the value 5, resulting in the result value being output at point C in the stage EX3 of the ALU pipeline 30. This combination is illustrated by the arrow 315 in FIG. 5. Thereafter, in the write back stage, the data value will appear at point W, as indicated by the arrow 320 in FIG. 5. From FIG. 5, it will be seen that there is a penalty of two cycles between the LSU generating the address for the data value to be stored in register R0, and that data value actually becoming available to the subsequent add instruction.

Figure 6:
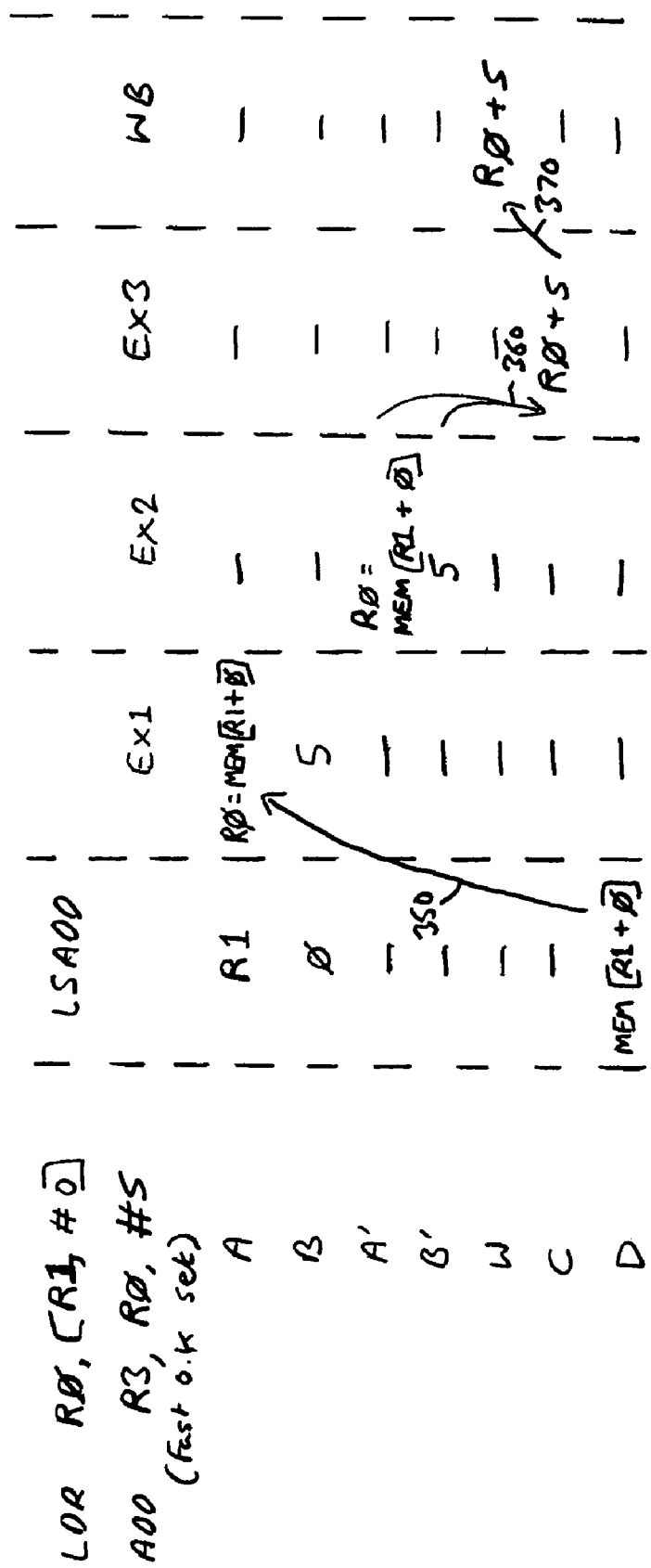
FIG. 6 is a timing diagram illustrating the execution of a load instruction followed by an add instruction within a data processing system in accordance with an embodiment of the present invention.

FIG. 6 illustrates the same sequence of two instructions when executed on the apparatus of FIG. 2, and in a situation where the data value is stored within the holding register 60. In this example, the same signals become available during the LSADD stage of the LSU pipeline 40 as were available in the FIG. 5 example. However, also during this LSADD stage, the second comparison logic 170 will confirm that the data value held in the holding register is the data value required by the load operation. Accordingly, in this cycle, this value can be output by the holding register 60 at point D, and in particular can be routed to the input of multiplexer 120, such that in the next cycle (the EX1 stage of the add instruction) that value can appear at point A. This transfer of the signal from the holding register 60 to the ALU pipeline 30 is illustrated by the arrow 350 in FIG. 6. In the subsequent cycle (the EX2 stage of the add instruction), the data value is propagated through multiplexer 135 to appear at point A', whilst the other operand for the add instruction can appear at point B'. Hence, at this stage, the subsequent add instruction can be in the EX2 stage, and therefore can complete in the manner described earlier with reference to FIG. 5. However, as can now be seen from a comparison of FIG. 6 with FIG. 5, there is no longer the two cycle penalty 300 that is observed when the holding register is not used or when the required data value is not within the holding register. Accordingly, it can be seen that in situations where the data value required by the load instruction is stored within the holding register, a significant increase in performance can be observed within the data processing apparatus.

The crossing out in FIG. 6 of the DC1, DC2, and WB stages of the LSU pipeline 40 is intended to illustrate that no memory access is in this instance performed by the LSU 40, given the detection of the required data value in the holding register 60. However, typically the LDR instruction will continue through the LSU pipeline 40, and be retired in the WB stage. Accordingly, the load data from the holding register may be passed down the LSU pipeline and written to the register file.

Figure 8:
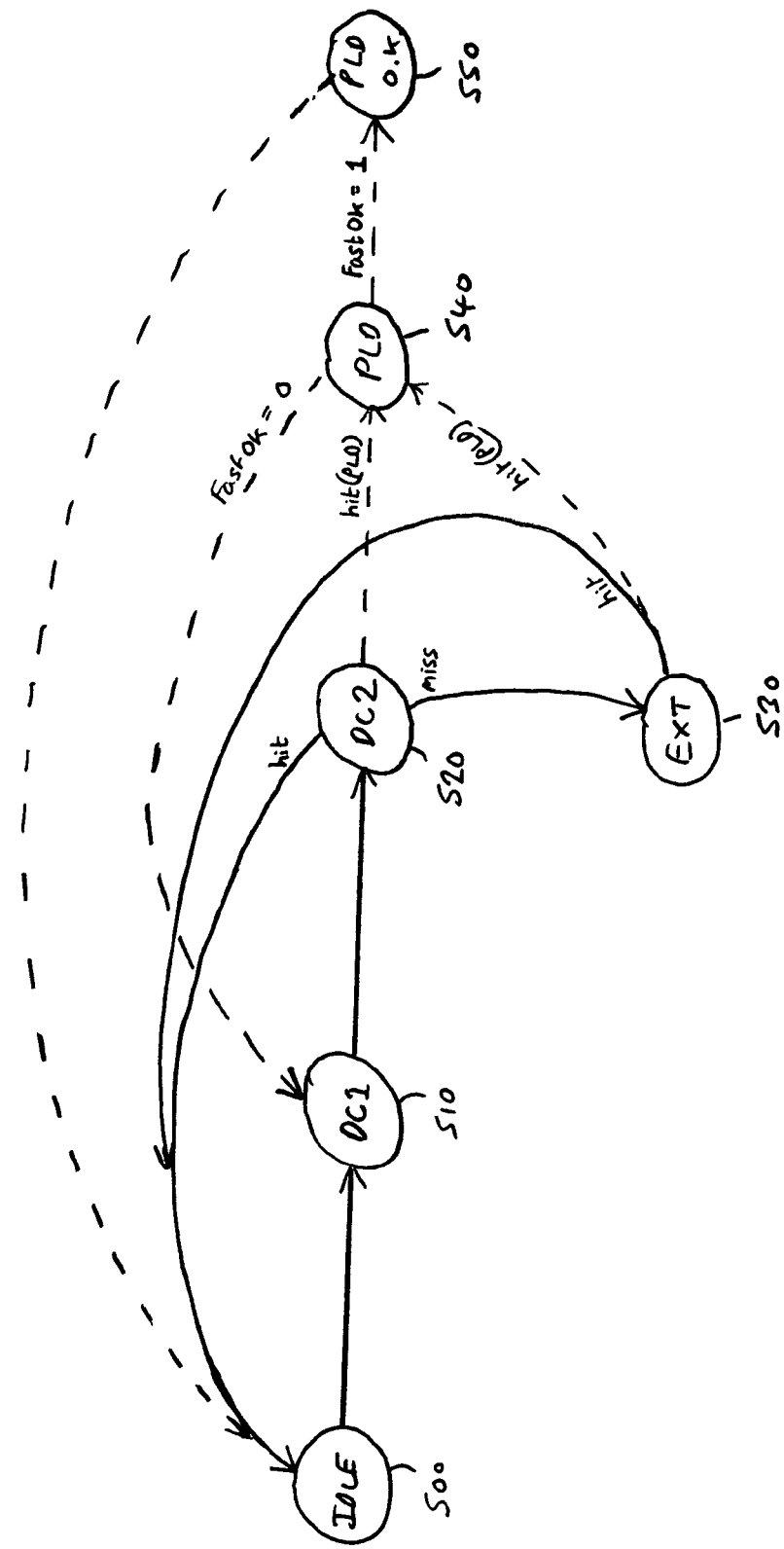
FIG. 8 is a diagram illustrating the states of a state machine provided within the load-store unit of a data processing apparatus in accordance with an embodiment of the present invention.

The LSU 40 may in one embodiment incorporate a state machine having a plurality of slots, for example three slots, into which instructions received by the LSU can be placed. As the instruction is executed within the LSU pipeline 40, it transitions between different states of the state machine. The states that may be provided within each slot of the state machine in accordance with one embodiment of the present invention are illustrated in FIG. 8.

In a first state, the slot is said to be in an idle state 500 where it is free to accept a new instruction. When a load instruction (with no associated earlier preload instruction) is allocated to the slot (this occurring at the LSADD stage), the state transitions to the DC1 state 510, during which the effective address computed during the LSADD stage is issued to the data cache, at which point the state transitions to the DC2 state 520. In the DC2 state 520, the result of the access request is awaited. If a hit is detected in the cache 80, then the data value will be returned to the core, and the state will transition from the DC2 state 520 back to the idle state 500 to allow the slot to be allocated to another instruction. However, in the event of a miss, the state will move to the external state 530, whilst a linefill process takes place. Ultimately, when the data value is returned to the core, the external state 530 will then transition back to the idle state 500.

However, in accordance with an embodiment of the present invention, two further states 540 and 550 are provided for handling preload instructions and their associated load instructions. In particular, if a preload instruction is allocated to the slot, and transitions through the states 500, 510 and 520, then if a hit is detected in the cache 80 whilst the preload instruction is in the DC2 state 520, the data value is stored in the holding register 60 and the state then transitions to the preload state 540. If a cache miss occurs, then the state may return directly to the idle state 500. However, optionally, if the holding register 60 is still arranged ultimately to store the data value returned from the cache, the state will move to the external state 530 from the DC2 state 520, and then when that data value is available, the state can transition from the external state 530 to the preload state 540.

At this point, the job of the preload instruction is complete, but unlike with other instructions, the state machine has not returned to the idle state 500, and accordingly that slot is not generally available for allocation to other instructions.

Subsequent load and store instructions get issued into free "IDLE" slots, overwriting any slots whose states are in the PLD state 540 if a pipeline stall would occur due to no free slots otherwise being available. In addition, the slot selection algorithm is modified so that a subsequent load instruction will preferentially get allocated to a slot in the PLD state 540 if that load instruction has the same destination register or addressing mode as the preload instruction previously allocated to that slot. Accordingly, the preload instruction can be thought of as reserving the subsequent load instruction a slot and possibly having the load instruction's data ready and waiting.

Hence, with reference to FIG. 2, if the first comparison logic 110 detects a match, and accordingly sets the Fastode signal, then the load instruction can be allocated to the slot already occupied by the associated preload instruction, and will typically enter that slot in the preload state 540. Then, subsequently, when the Fast Ok signal is generated, the slot will transition from the preload state 540 directly back to the DC1 state 510 in the event that the Fast Ok signal is not set, thereby indicating that there is not a match in the holding register. This will then enable the load instruction to perform the normal memory access with respect to the memory system, during which it will transition through the DC2 and (if required) external states 520, 530. However, in the event that the Fast Ok signal is set, the slot will transition from the PLD state 540 to the PLD Ok state 550, and will remain in that state until such time that it is considered appropriate to retire the data value in the holding register 60 to the appropriate register of the register file 50. As mentioned previously, this may not occur straight away, since the register file may be arranged such that data values are written into the register file in an order specified by the program running in the data processing apparatus, and accordingly it may be appropriate for the holding register 60 to wait for a couple of cycles before outputting the data value to the register file 50. However, once the data value has been output to the register file, then the state will transition from the PLD Ok state 550 back to the idle state 500, thereby allowing the slot to be allocated to a new instruction.

With reference to the above-described embodiments of he present invention, it can be seen that the use of the holding register as described herein can provide significant performance benefits within the core. The persistence of the data held in the holding register can be made conservative/pessimistic enough so that the implementation is completely transparent to the code being executed on the core. For example, the holding register can be flushed in the event of:
1. execution of any store, store multiple, swap or STC (Store Coprocessor) instruction (this could be enhanced so that flushing only takes place if the store address matches the preload address);
2. occurrence of any interrupts or other exceptions (including an abort on preload data);
3. the occurrence of any debug events;
4. the occurrence of any accesses to a control coprocessor;
5. optionally in the presence of any other loads; and
6. optionally in the presence of any branch mispredictions.

The benefit of the approach employed by embodiments of the present invention is that it can accelerate loading of data by alleviating load-use penalty effects in addition to cache effects. Furthermore, the arrangement of the holding register can be made conservative enough to retain compatibility with operating systems, as there are no side-effects, or architectural view changes.

From the above discussion, it can be seen that embodiments of the present invention that employ the holding register in the above-described manner provide an extension of the existing prefetch hint operation by allowing the returned data value to selectively be placed within the holding register for subsequent reference during operation of an associated load instruction. Further, the process can be speculative and can be arranged to discard results whenever events are detected which may signify that it would be inappropriate to rely on the contents of the holding register. Furthermore, the process is always backed up by the following associated load instruction, and accordingly is always recoverable. For example, considering the earlier described embodiment of FIG. 2, if the Fast Ok signal did not become available until the EX2 stage, but reliance had been taken on the likelihood of that Fast Ok signal being set, and accordingly the data from the holding register had been forwarded to the ALU pipeline for use in a subsequent add instruction, then if the Fast Ok signal ultimately is determined not to be set, then appropriate recovery behaviour can be readily invoked, for example by flushing the pipeline and restarting the load instruction without relying on the contents of the holding register.

As another example, if an interrupt occurs between the preload instruction and the associated load instruction, such that a long period of time occurs between execution of the preload instruction and execution of the load instruction and hence the holding register's content cannot be relied upon, then when the program is returned to, the holding register's contents can be invalidated such that when the load is executed it will obtain the data from the memory system rather than from the holding register.

It will be appreciated that when generating program code to be run on a data processing apparatus employing one or more holding registers in accordance with embodiments of the present invention, the compiler or skilled programmer could use knowledge of the holding register arrangement to optimise the code. For example, since use of embodiments of the present invention will alleviate load-use penalty effects, this may alter the point at which use of a preload instruction within the code might yield a performance benefit. Further it may be possible to seek to reduce within the code situations which will give rise to the holding register being invalidated before the associated load instruction can use it, or to reduce situations which will give rise to the FastOk determination yielding a FastOk signal of zero (i.e. indicating that there is no match with the contents of the holding register).

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
   a data processing unit operable to execute instructions;
   a register file having a plurality of registers operable to store data values accessible by the data processing unit when executing said instructions;
   a holding register not forming one of a working set of registers of the register file and operable to temporarily store a data value, the holding register having a data portion for storing the data value, and an identifier portion operable to store identifier data associated with the data value;
   the data processing unit being responsive to a preload instruction to issue a preload memory access request to a memory system to cause a data value identified by the preload instruction to be located in the memory system, and dependent on predetermined criteria to cause a copy of that data value along with associated identifier data to be loaded from the memory system into the holding register; and
   the data processing unit being responsive to a load instruction to cause a comparison operation to be performed to determine whether identifier data derived from the load instruction matches the identifier data in the identifier portion of the holding register, and in the event of a match to cause the data value stored in the holding register to be made available to the data processing unit without requiring a memory access request to be issued to the memory system, and in the event of no match to issue the memory access request to the memory system to cause a data value identified by the load instruction to be made available to the data processing unit from the memory system.

2. A data processing apparatus as claimed in claim 1, wherein in the event of a match resulting from the comparison operation, the data value stored in the holding register is made available to the data processing unit by causing the data value to be transferred into a specified register of the register file.

3. A data processing apparatus as claimed in claim 1, wherein the data processing unit is a pipelined data processing unit, and in the event of a match from the comparison operation, the data value stored in the holding register is made available to the data processing unit by causing the data value to be output over a path to a predetermined pipeline stage of the data processing unit.

4. A data processing apparatus as claimed in claim 1, wherein the holding register has a contents valid field indicating whether the contents of the holding register are valid, if the contents valid field indicates that the contents of the holding register are not valid, the data processing unit being responsive to the load instruction to issue the memory access request to the memory system without determining whether the identifier data derived from the load instruction matches the identifier data in the identifier portion of the holding register.

5. A data processing apparatus as claimed in claim 4, wherein the holding register further comprises a data valid field indicating whether the holding register contains a valid data value.

6. A data processing apparatus as claimed in claim 4, wherein the contents of the holding register are invalidated if any intervening event that occurs after the preload instruction is executed but before the load instruction is executed is one of a number of predetermined types of event, said types of event being events which make it inappropriate to consider relying on the contents of the holding register when executing the load instruction.

7. A data processing apparatus as claimed in claim 4, wherein the contents of the holding register are invalidated a predetermined number of clock cycles after the data value is stored in the holding register.

8. A data processing apparatus as claimed in claim 1, wherein the predetermined criteria employed to determine whether to cause the data value identified by the preload instruction to be loaded from the memory system into the holding register comprises an indication of the availability of the data value from the memory system.

9. A data processing apparatus as claimed in claim 1, wherein the predetermined criteria employed to determine whether to cause the data value identified by the preload instruction to be loaded from the memory system into the holding register comprises a determination as to whether, if the preload instruction were a load instruction, an abort would be generated as a result of the associated memory access request.

10. A data processing apparatus as claimed in claim 1, wherein the memory system is a hierarchical memory system, and the preload memory access request issued by the data processing unit in response to a preload instruction is operable to cause the data value identified by the preload instruction to be transferred to a predetermined hierarchical level of the memory system.

11. A data processing apparatus as claimed in claim 10, wherein the predetermined hierarchical level is a cache of the memory system.

12. A data processing apparatus as claimed in claim 1, wherein a plurality of said holding registers are provided to enable a plurality of data values to be temporarily stored.

13. A data processing apparatus as claimed in claim 1, further comprising first comparison logic operable during the comparison operation to compare a first portion of the identifier data with corresponding identifier data derived from the load instruction in order to determine whether the data value temporarily stored in the holding register might be the data value identified by the load instruction.

14. A data processing apparatus as claimed in claim 13, wherein the first portion of the identifier data comprises addressing mode data.

15. A data processing apparatus as claimed in claim 13, wherein the first portion of the identifier data comprises a destination register identifier identifying the destination register for a load instruction associated with the preload instruction.

16. A data processing apparatus as claimed in claim 13, further comprising second comparison logic operable during the comparison operation to compare a second portion of the identifier data with corresponding identifier data derived from the load instruction in order to determine whether the data value temporarily stored in the holding register is the data value identified by the load instruction.

17. A data processing apparatus as claimed in claim 16, wherein the second comparison logic is only employed if the first comparison logic indicates that the data value temporarily stored in the holding register might be the data value identified by the load instruction.

18. A data processing apparatus as claimed in claim 16, wherein the second portion of the identifier data comprises data from which a memory address for a memory access request is derivable.

19. A data processing apparatus as claimed in claim 16, wherein the second portion of the identifier data comprises a memory address for a memory access request.

20. A data processing apparatus as claimed in claim 13, further comprising third comparison logic operable for every intervening instruction that is to be executed after the preload instruction is executed but before the load instruction is executed, to compare a destination register for each such intervening instruction with a base register identifier provided within the identifier data of the holding register, the base register identifier identifying a base address from which a memory address for a memory access request is derivable, in the event that the destination register matches the base register identifier, the third comparison logic being operable to issue an invalidate signal operable to cause the contents of the holding register to be invalidated.

21. A data processing apparatus as claimed in claim 1, wherein the data processing unit comprises a state machine having a plurality of slots, when an instruction is to be executed by the data processing unit that instruction being allocated to an available slot, each slot having a plurality of interconnected states, and the state machine being operable to pass the allocated instruction through a sequence of said states of the slot during execution of the allocated instruction, when a preload instruction has completed execution the state machine being operable to cause that preload instruction to continue to occupy the slot such that when a subsequent load instruction is detected as being associated with that preload instruction, that subsequent load instruction is allocated to the same slot already occupied by the preload instruction.

22. A data processing apparatus as claimed in claim 21, wherein the preload instruction is arranged to continue to occupy the slot by moving to a predetermined state when execution of the preload instruction has completed, the subsequent load instruction that is detected as being associated with that preload instruction being arranged to enter the slot at that predetermined state.

23. A method of operating a data processing apparatus, the data processing apparatus comprising a data processing unit operable to execute instructions, a register file having a plurality of registers operable to store data values accessible by the data processing unit when executing said instructions, and a holding register not forming one of a working set of registers of the register file and operable to temporarily store a data value, the holding register having a data portion for storing the data value, and an identifier portion operable to store identifier data associated with the data value, the method comprising the steps of:
  responding to a preload instruction by:
    (a) issuing a preload memory access request to a memory system to cause a data value identified by the preload instruction to be located in the memory system; and
    (b) dependent on predetermined criteria causing a copy of that data value along with associated identifier data to be loaded from the memory system into the holding register,
  and responding to a load instruction by:
    (i) performing a comparison operation to determine whether identifier data derived from the load instruction matches the identifier data in the identifier portion of the holding register;
    (ii) in the event of a match causing the data value stored in the holding register to be made available to the data processing unit without requiring a memory access request to be issued to the memory system; and
    (iii) in the event of no match issuing the memory access request to the memory system to cause a data value identified by the load instruction to be made available to the data processing unit from the memory system.

24. A method as claimed in claim 23, wherein at said step (ii) the data value stored in the holding register is made available to the data processing unit by causing the data value to be transferred into a specified register of the register file.

25. A method as claimed in claim 23, wherein the data processing unit is a pipelined data processing unit, and at said step (ii) the data value stored in the holding register is made available to the data processing unit by causing the data value to be output over a path to a predetermined pipeline stage of the data processing unit.

26. A method as claimed in claim 23, wherein the holding register has a contents valid field indicating whether the contents of the holding register are valid, if the contents valid field indicates that the contents of the holding register are not valid, the method comprising the step of:
  responding to the load instruction by issuing the memory access request to the memory system without determining whether the identifier data derived from the load instruction matches the identifier data in the identifier portion of the holding register.

27. A method as claimed in claim 26, wherein the holding register further comprises a data valid field indicating whether the holding register contains a valid data value.

28. A method as claimed in claim 26, further comprising the step of:
  invalidating the contents of the holding register if any intervening event that occurs after the preload instruction is executed but before the load instruction is executed is one of a number of predetermined types of event, said types of event being events which make it inappropriate to consider relying on the contents of the holding register when executing the load instruction.

29. A method as claimed in claim 26, further comprising the step of:
  invalidating the contents of the holding register a predetermined number of clock cycles after the data value is stored in the holding register.

30. A method as claimed in claim 23, wherein the predetermined criteria employed at said step (b) to determine whether to cause the data value identified by the preload instruction to be loaded from the memory system into the holding register comprises an indication of the availability of the data value from the memory system.

31. A method as claimed in claim 23, wherein the predetermined criteria employed at said step (b) to determine whether to cause the data value identified by the preload instruction to be loaded from the memory system into the holding register comprises a determination as to whether, if the preload instruction were a load instruction, an abort would be generated as a result of the associated memory access request.

32. A method as claimed in claim 23, wherein the memory system is a hierarchical memory system, and the preload memory access request issued at said step (a) is operable to cause the data value identified by the preload instruction to be transferred to a predetermined hierarchical level of the memory system.

33. A method as claimed in claim 32, wherein the predetermined hierarchical level is a cache of the memory system.

34. A method as claimed in claim 23, wherein a plurality of said holding registers are provided to enable a plurality of data values to be temporarily stored.

35. A method as claimed in claim 23, further comprising the step of:
  at said step (i), comparing a first portion of the identifier data with corresponding identifier data derived from the load instruction in order to determine whether the data value temporarily stored in the holding register might be the data value identified by the load instruction.

36. A method as claimed in claim 35, wherein the first portion of the identifier data comprises addressing mode data.

37. A method as claimed in claim 35, wherein the first portion of the identifier data comprises a destination register identifier identifying the destination register for a load instruction associated with the preload instruction.

38. A method as claimed in claim 35, further comprising the step of:
  at said step (i) comparing a second portion of the identifier data with corresponding identifier data derived from the load instruction in order to determine whether the data value temporarily stored in the holding register is the data value identified by the load instruction.

39. A method as claimed in claim 38, wherein the step of comparing the second portion of the identifier data is only employed if the step of comparing a first portion of the identifier data indicates that the data value temporarily stored in the holding register might be the data value identified by the load instruction.

40. A method as claimed in claim 38, wherein the second portion of the identifier data comprises data from which a memory address for a memory access request is derivable.

41. A method as claimed in claim 38, wherein the second portion of the identifier data comprises a memory address for a memory access request.

42. A method as claimed in claim 23, further comprising the steps of:
  for every intervening instruction that is to be executed after the preload instruction is executed but before the load instruction is executed, comparing a destination register for each such intervening instruction with a base register identifier provided within the identifier data of the holding register, the base register identifier identifying a base address from which a memory address for a memory access request is derivable; and
  in the event that the destination register matches the base register identifier, issuing an invalidate signal operable to cause the contents of the holding register to be invalidated.

43. A method as claimed in claim 23, wherein the data processing unit comprises a state machine having a plurality of slots, the method comprising the steps of:
  when an instruction is to be executed by the data processing unit, allocating that instruction to an available slot, each slot having a plurality of interconnected states;
  passing the allocated instruction through a sequence of said states of the slot during execution of the allocated instruction;
  when a preload instruction has completed execution, causing that preload instruction to continue to occupy the slot;
  when a subsequent load instruction is detected as being associated with that preload instruction, allocating that subsequent load instruction to the same slot already occupied by the preload instruction.

44. A method as claimed in claim 43, wherein the preload instruction continues to occupy the slot by moving to a predetermined state when execution of the preload instruction has completed, and the subsequent load instruction that is detected as being associated with that preload instruction enters the slot at that predetermined state.

* * * * *